United States Patent [19]

Akesaka

[11] Patent Number: 4,898,498

[45] Date of Patent: Feb. 6, 1990

[54] THRUST TRANSMITTING DEVICE

[75] Inventor: Toshio Akesaka, Yokohama, Japan

[73] Assignee: Kabushiki Kaisha Iseki Kaihatsu Koki, Tokyo, Japan

[21] Appl. No.: 253,853

[22] Filed: Oct. 5, 1988

[30] Foreign Application Priority Data

Dec. 7, 1987 [JP] Japan ................................. 62-307687

[51] Int. Cl.⁴ ............................................... F16L 1/00
[52] U.S. Cl. ...................................... 405/184; 175/73; 175/74; 405/154; 405/143
[58] Field of Search ................... 405/184, 154; 175/74, 175/73, 75, 76, 61, 62

[56] References Cited

U.S. PATENT DOCUMENTS

| 1,355,290 | 10/1920 | Updegraff | 405/143 |
| 3,011,568 | 12/1961 | Grimm | 175/74 |
| 4,042,046 | 8/1977 | Capoccia | 175/73 |
| 4,446,932 | 5/1984 | Hipp | 175/74 |

FOREIGN PATENT DOCUMENTS

DT2537365-
B1 1/1977 Fed. Rep. of Germany ...... 405/184

Primary Examiner—Dennis L. Taylor
Attorney, Agent, or Firm—Mattern, Ware, Stoltz & Fressola

[57] ABSTRACT

A device for transmitting a thrust from one of a pair of adjacent pipes so as to propel the other comprises a pair of annular members adapted to be slidable relatively to each other along their spherical surfaces.

5 Claims, 3 Drawing Sheets

F I G. 1
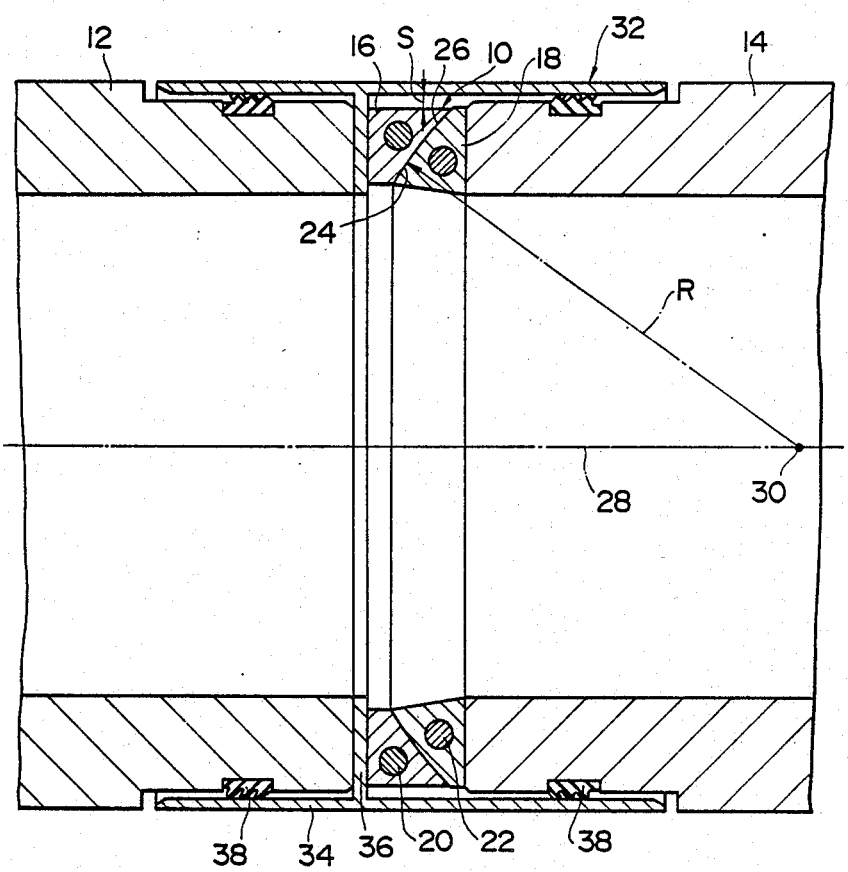

THRUST TRANSMITTING DEVICE

BACKGROUND OF THE INVENTION

1. Field of the Invention

This invention relates to a device for transmitting a thrust from one of a pair of adjacent pipes so as to propel the other in a pipe propelling method.

2. Description of the Prior Art

As for one of methods for constructing a pipeline in the ground, there has been proposed a pipe propelling method, in which a plurality of pipes are sequentially forced into the ground in series. According to this pipe propelling method, end faces of adjacent pipes face to each other through a flange provided on a tubular collar for receiving pipe ends. Also, a thrust to be applied to a leading pipe is transmitted from the following pipes through the flange.

In the conventional pipe propelling method, when the adjacent pipes pass through a straight portion of the pipeline to be constructed, the whole end faces of the adjacent pipes are in contact with the flange, so that the thrust acts uniformly on the whole end faces of the adjacent pipes. However, when the leading pipe differs from the following pipe in the propelling direction in such a case that the adjacent pipes pass through a curved portion of the pipeline to be constructed, the leading pipe is inclined to the following pipe, so that the thrust is transmitted through part of the adjacent pipes. Consequently, according to the conventional pipe propelling method, the thrust is concentrated on a portion of the pipe, thus resulting in the occurrence of cracks on the pipe portion and breakage of the pipe portion.

To prevent these problems, there has been proposed the following prior art method, in which a connecting mechanism provided with a plurality of jacks is disposed between adjacent pipes, and a predetermined jack is operated to incline the leading pipe to the following pipe when these adjacent pipes pass through a curved portion of a pipeline to be constructed. In this prior art method, however, since the connecting mechanism has to be finally removed, this method can not be used when constructing a the pipeline having such a small bore that an operator cannot enter to remove the connecting mechanism.

SUMMARY OF THE INVENTION

An object of the present invention is to provide a device for transmitting a thrust from one of a par of adjacent pipes to be propelled to the other without concentrating the thrust on part of the adjacent pipes and capable of applying to a method of constructing a pipeline having such small bore that an operator cannot enter.

The device disposed between a pair of adjacent pipes for transmitting a thrust from one pipe to the other according to the present invention comprises a first ring provided on the side with a spherical convex surface and a second ring provided on the side with a spherical concave surface adapted to slidably abut against the convex surface, one of the rings being disposed movably in the radial direction of the rings with respect to both pipes and the other of the rings.

When the adjacent pipes are propelled along a straight line, both annular members are maintained such that their axes are aligned with each other, since the adjacent pipes are advanced with their axes aligned with each other, whereas when the adjacent pipes are propelled along a curve, both annular members are maintained such that their axes cross each other, since the leading pipe is bent relative to the following pipe at the position of the annular member.

According to the thrust transmitting device of the present invention, since both rings are adapted to abut relatively slidably against each other on their spherical faces, both rings contact each other on a wide range of the spherical surface. Also, since one of the rings is movable in the radial direction of the rings with respect to both pipes and the other ring, one of the rings is moved radially of the rings with respect to the other when the pipes adjacent to each other are thrusted along the curved path. As a result, no overload concentrates on part of both rings and the adjacent pipes. Furthermore, both rings do not need to be removed, so that this device can be applied to the construction of the pipeline having such a small bore that an operator cannot enter.

BRIEF DESCRIPTION OF THE DRAWINGS

The foregoing and other objects and features of the invention will become apparent from the following description of a preferred embodiment of the invention with reference to the accompanying drawings, in which:

FIG. 1 is a sectional view showing a thrust transmitting device according to the present invention, together with pipes to be propelled and a collar;

DETAILED DESCRIPTION OF PREFERRED EMBODIMENT

Figure 2:
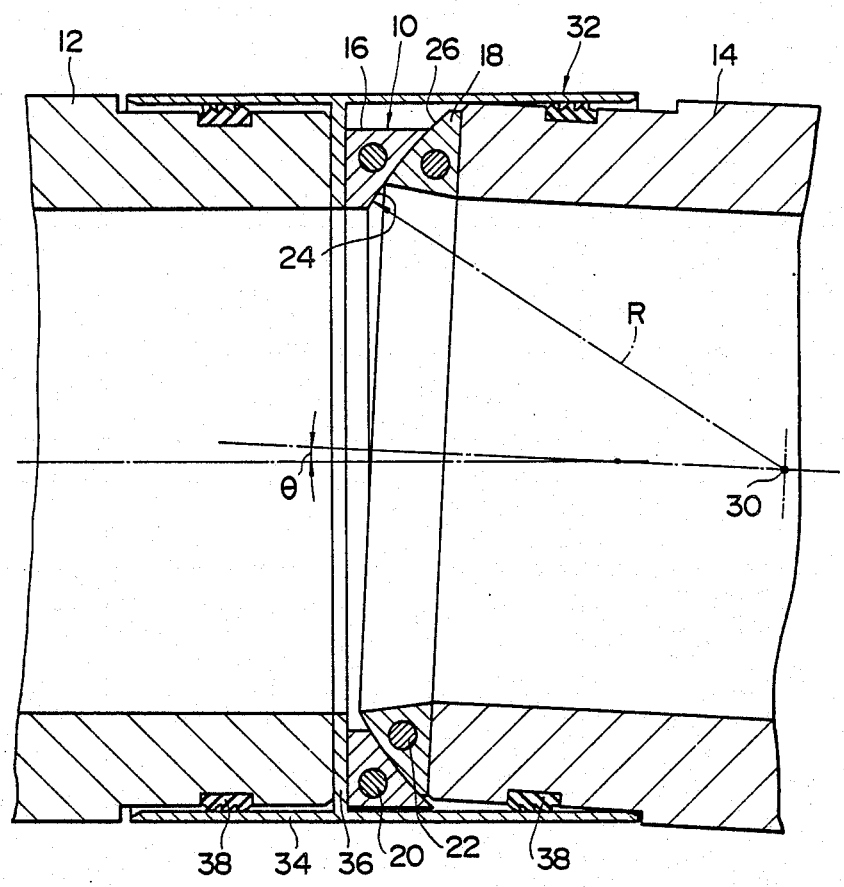
FIG. 2 is a sectional view showing the pipes and collar reaching a curved path.

A thrust transmitting device 10 shown in FIG. 1 comprises a pair of rings 16,18 disposed between a pair of adjacent pipes 12,14 to transmit a thrust from one of the pipes 12,14 to the other. The outer diameter of both ends of each pipe 12,14 is formed smaller than that of an intermediate portion of the each pipe.

The rings 16,18 are formed of materials such as glass fiber, plastic, asbestos or the like. In the rings 16,18 are preferably embedded respective annular core members 20,22 in order to improve the mechanical strength of the ring. The ring 16 is provided on one side with a concave surface 24, while the ring 18 is provided on one side with a convex surface 26 adapted to slidably abut against the concave surface 24.

The concave and convex surfaces 24,26 are spherical surfaces of the radius R having the center 30 on the axis 28 of the rings 16,18.

A collar 32 is disposed on the connection between the pipes 12,14. The collar 32 is provided with a tubular main body 34 for receiving the ends of respective pipes 12,14 and an inward flange 36 extending from the inner peripheral surface of the main body 34 along a surface perpendicular to the axis of the main body 34.

The inner diameter of the main body 34 is larger than the outer diameter of the ends of the pipes 12, 14, and than the outer diameter of the rings 16, 18. Further, the outer diameter of the main body 34 is approximately equal to that of the intermediate portion of the pipes 12, 14.

The collar 32 is disposed so as to receive the rear end of the leading pipe 12 in the front end of the main body 34 and receive the front end of the following pipe 14 in the rear end. On both ends of respective pipes 12,14 are previously disposed seal materials 38 for liquid-tightly sealing a portion between the outer peripheral surface of the ends of the respective pipes and the inner peripheral surface of the main body 34 of the collar 32.

The rings 16,18 in the embodiment shown have the concave and convex surfaces 24,26 relatively slidably abutting against each other along the spherical surfaces of the radius R and disposed between the flange 36 and the front end face of the pipe 14 such that the ring 16 is placed at the side of the flange 36 and the ring 18 is placed at the side of the pipe 14. The ring 16 is disposed to be movable in the radial direction of the ring 16 relative to the pipes 12,14, flanges 36 and ring 18. On the contrary, the ring 18 is fixed to the front end face of the pipe 14.

Further, the rings 16,18 may be disposed between the flange 36 and the rear end face of the pipe 12, or disposed such that the ring 16 is placed at the rear side and the ring 18 is placed at the front end side. Also, both rings 16,18 may be disposed to be movable in the radial direction of the rings 16,18 relative to the pipes 12,14 and collar 32. The ring 18 may be disposed to be movable in the radial direction of the ring 18 relative to the pipes 12,14, collar 32 and ring 16 while the ring 16 may be fixed to the end face of the pipe 14 or 12. Further, instead of fixing one ring to the pipe, a spherical surface having the radius R of curvature may be formed on the end face of the pipe.

As shown in FIG. 1, when the pipes 12,14 are advanced along a common straight line, the concave surface 24 of the ring 16 is brought into contact with the convex surface 26 of the ring 18 such that the axes of the rings 16,18 are coincident with each other, since the axes of the pipes 12,14 are coincident with each other. Thus, a thrust applied to the pipe 14 is transmitted from the pipe 14 to the pipe 12 through the rings 18,16 and flange 36 in the order mentioned.

Accordingly, the pipes 12,14 are advanced straight.

When the pipes 12,14 are advanced along the common straight line, the thrust is not concentrated on a portion of both rings 16,18 and thus a portion of the pipes 12,14, since the rings 16,18 contact each other on a wide range of the concave and convex surfaces 24,26.

When the leading pipe 12 reaches a curved path in which the leading pipe 12 tends to incline downward to the following pipe 14 for example, a force for moving the ring 16 downward acts on the ring 16 through the thrust applied to the pipe 14. Then, since a gap S shown in FIG. 1 remains between the ring 16 and the main body 34 of the collar 32, the ring 16, as shown in FIG. 2, is displaced downward relative to the ring 18 by a value determined by a slant angle $\theta$ of the pipe 12 with respect to the pipe 14. The displacement of the ring 16 relative to the ring 18 takes place as the angle $\theta$ increases. While the angle $\theta$ increases, the rings 16,18 maintain the state of the concave and convex surfaces 24,26, which contact each other.

While the pipe 12 is moved inclinedly relative to the pipe 14 by a certain angle $\theta$, the ring 16 maintains its state displaced relative to the ring 18 by a value determined by the angle $\theta$. At this time, i.e., even if the pipes 12,14 are propelled along the curved path, the rings 16,18 also maintain the state of the concave and convex surfaces 24,26, which contact each other.

When the pipes 12,14 are advanced along a course such as to reduce the angle $\theta$, a force opposite to the aforementioned force for displacing the ring 16 upward relative to the ring 18 acts on the ring 16 by the thrust applied to the ring 18. Also, at that time, the rings 16,18 maintain the state of the concave and convex surfaces 24,26, which contact each other.

As above mentioned, since both rings 16,18 contact each other on the spherical concave and convex surfaces 24,26, one ring 16 is moved relative to the other ring 18 when the thrust is applied to the following pipe. Thus, according to the thrust transmitting device 10, both rings 16,18 always contact each other in a wide range of the concave and convex surfaces 24,26. In this manner, a load is not concentrated on a portion of the rings nor on a portion of the end faces of the pipes 12,14.

Figure 3:
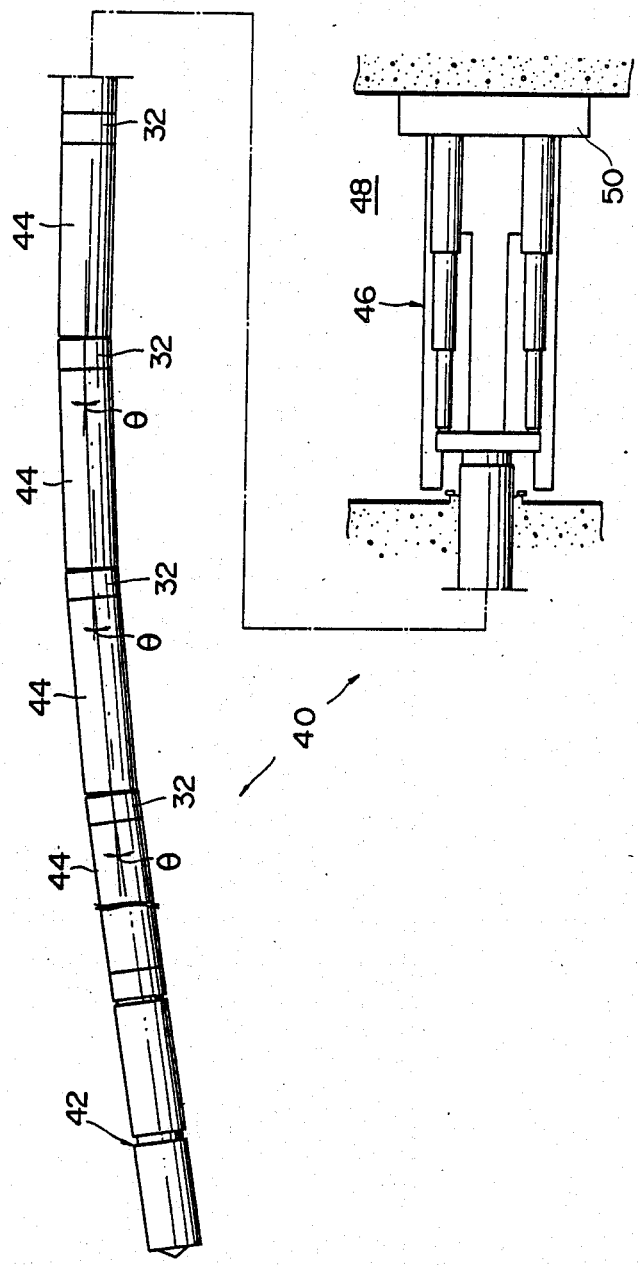
FIG. 3 shows an embodiment of a pipe propelling device using the thrust transmitting device.

FIG. 3 shows an embodiment of a pipe propelling device 40 using the rings 16,18. The pipe propelling device 40 comprises a well-known shield tunnelling machine 42. Behind the machine 42 are disposed a plurality of pipes 44 to be propelled. The thrust transmitting device 10 and collar 32 shown in FIGS. 1, 2 are disposed between the adjacent pipes 44. A well-known basic thrusting device 46 for giving a thrust to the machine 42 and respective pipes 44 is disposed in a vertical shaft 48.

The basic thrusting device 46 gives the thrust to the rearmost pipe 44 with a reaction obtained from a wall 50 constructed in the shaft 48. The thrust given to the rearmost pipe 44 is transmitted to the respective pipes 44 and machine 42 sequentially through the thrust transmitting device disposed in front of the rearmost pipe 44.

What is claimed is:

1. A thrust transmitting device disposed between a pair of adjacent pipes for transmitting a thrust from one of the pipes to the other, comprising a first ring provided on one side with a spherical concave surface and a second ring provided on one side with a spherical convex surface adapted to abut relatively slidably against said concave surface of said first ring, at least one of said rings being slidably mounted for movement in the radial direction of said rings with respect to both pipes and the other ring whereby said at least one of said rings can move in the radial direction when the pipes are thrust along a curved path.

2. A thrust transmitting device as claimed in claim 1, wherein the other of said rings is disposed movably in the radial direction of said rings with respect to both pipes and the one of said rings.

3. A thrust transmitting device as claimed in claim 1, wherein the other of said rings is disposed unmovably in the other of said pipes.

4. A thrust transmitting device as claimed in claim 1, wherein an annular reinforcing core material is embedded in each of said rings.

5. A thrust transmitting device as claimed in claim 1, wherein the centers of the radii of curvature of said convex surface and said concave surface are on the center axes of said first and second rings.

* * * * *